UNITED STATES PATENT OFFICE.

ANTON OSSENBECK, OF ELBERFELD, AND ARTHUR ZART, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

RED AZO DYE.

1,027,148.  Specification of Letters Patent.  Patented May 21, 1912.

No Drawing.  Application filed September 26, 1911.  Serial No. 651,336.

*To all whom it may concern:*

Be it known that we, ANTON OSSENBECK and ARTHUR ZART, doctors of philosophy, chemists, citizens of the German Empire, residing, respectively, at Elberfeld and Vohwinkel, near Elberfeld, Germany, have invented new and useful Improvements in Red Azo Dye, of which the following is a specification.

Our invention relates to the manufacture and production of a new azo dyestuff which is obtained by combining the diazotized monoazo dyestuff prepared from diazotized 3-chloro-2-toluidin-5-sulfonic acid and anilin with 2-benzoylamino-5-naphthol-7-sulfonic acid. It is a red powder soluble in water with a red coloration; yielding upon reduction with stannous chlorid and hydrochloric acid 5-chloro-2-toluidin-5-sulfonic acid, para-phenylenediamin and 2-benzoylamino-6-amino-5-naphthol-7-sulfonic acid; and dyeing cotton red fast to light.

In order to illustrate the new process more fully the following example is given, the parts being by weight:—325.5 parts of the monoazo dyestuff:

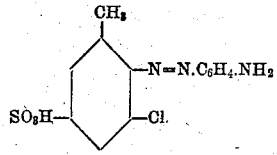

obtained from 3-chloro-2-toluidin-5-sulfonic acid and monomethylanilin-ω-sulfonic acid according to the process of British Letters Patent No. 11343/99, are diazotized with 69 parts of sodium nitrite and hydrochloric acid and the diazo derivative is combined in acetic acid solution with 343 parts of benzoyl-2-amino-5-naphthol-7-sulfonic acid. As soon as the combination is complete the solution is heated to about 70° C. and the dyestuff is salted out.

We claim:—

The herein described new azo dyestuff of the formula:

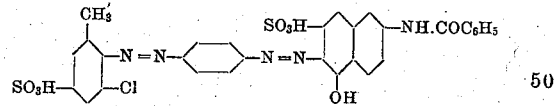

which is a red powder soluble in water with a red coloration; yielding upon reduction with stannous chlorid and hydrochloric acid 5-chloro-2-toluidin-3-sulfonic acid, para-phenylenediamin and 2-benzoylamino-6-amino-5-naphthol-7-sulfonic acid; and dyeing cotton red fast to light, substantially as described.

In testimony whereof we have hereunto set our hands in the presence of two subscribing witnesses.

ANTON OSSENBECK. [L. S.]
ARTHUR ZART. [L. S.]

Witnesses:
L. NUFER,
A. NUFER.